United States Patent [19]

Smith

[11] Patent Number: 5,376,629

[45] Date of Patent: Dec. 27, 1994

[54] OIL-BASED DRILLING MUDS COMPRISING A WEIGHTING AGENT HAVING A SILOXANE OR SILANE COATING THEREON

[75] Inventor: Phillip S. Smith, Hampshire, England

[73] Assignee: British Petroleum Company P.L.C., London, England

[21] Appl. No.: 751,284

[22] Filed: Aug. 29, 1991

[30] Foreign Application Priority Data

Aug. 29, 1990 [GB] United Kingdom ............... 9018832

[51] Int. Cl.$^5$ ................................................ C09K 7/00
[52] U.S. Cl. ....................................... 507/127; 507/901
[58] Field of Search ................... 106/471; 252/8.515, 252/8.511; 507/901, 910, 127

[56] References Cited

U.S. PATENT DOCUMENTS

| | | | |
|---|---|---|---|
| 2,055,666 | 9/1936 | Moore et al. | 252/8.515 |
| 2,858,270 | 10/1958 | Harrison | 252/8.51 |
| 2,900,337 | 8/1959 | Earley et al. | 252/8.51 |
| 3,227,579 | 1/1966 | Bluestein | 252/8.51 X |
| 4,183,814 | 1/1980 | Ramachandran | 252/8.511 |
| 4,312,765 | 1/1982 | Block | 252/8.51 X |
| 4,344,992 | 8/1982 | Ramachandran | 252/8.511 X |
| 4,434,210 | 2/1984 | Nakajima et al. | 428/447 |
| 4,451,537 | 5/1984 | Kennedy, Sr. et al. | 252/8.511 X |
| 4,894,093 | 1/1990 | Aderhold et al. | 106/471 X |
| 4,985,166 | 1/1991 | Leising et al. | |

OTHER PUBLICATIONS

Kirk–Othmer Encyclopedia of Chemical Technology, Second Ed. vol. 3, pp. 91–95.

*Primary Examiner*—Gary Geist
*Attorney, Agent, or Firm*—Fay, Sharpe, Beall, Fagan, Minnich & McKee

[57] ABSTRACT

An oil based drilling mud comprises (a) a base oil, (b) about 1 to about 170 parts by weight of an aqueous phase per 100 parts by weight of the oil, (c) about 0.25–40 g/l of at least one viscosifier, and (d) a hydrophobic weighting agent in amount sufficient to achieve a required mud density.

The hydrophobic weighting agent is preferably barite. The drilling muds do not contain emulsifiers or oil wetting agents and are particularly advantageous in their reduction in oil retention on cuttings and smaller reduction in permeability of oil bearing formations.

13 Claims, No Drawings

OIL-BASED DRILLING MUDS COMPRISING A WEIGHTING AGENT HAVING A SILOXANE OR SILANE COATING THEREON

This invention relates to drilling muds, in particular to emulsifier free oil-based muds used in the drilling of wells in underground mineral bearing formations.

Drilling muds are used to carry rock cuttings out of the wellbore and to the surface. Other functions of drilling muds are to cool and lubricate the drill bit, protect against blowouts by counteracting downhole formation pressure, maintain a stable borehole and to prevent loss of fluids to the formations drilled.

Both water-based and oil-based muds are used as drilling muds. Water-based muds are generally cheaper and less toxic than those based on oil but the latter possess many operational advantages particularly for the drilling of high angle, long reach and high pressure/high temperature wells.

However conventional oil-based muds (OBM's) also suffer from a number of undesirable characteristics. Oil may be retained on the drilled cuttings which has environmental implications. In addition the presence of emulsifiers and other oil wetting agents which are essential components of conventional OBM's can alter the wettability of reservoir formations thereby reducing their permeability to oil.

Emulsifiers and oil wetting agents are added to conventional OBM's to emulsify the water phase in the oil phase and to ensure that all of the solids in the mud are wetted by the oil.

The majority of formations drilled are naturally water-wet but when contacted by the emulsifiers present in OBM's can easily De changed to oil-wet. The ability to eliminate such emulsifiers would allow cuttings and reservoir formations drilled using OBM's to remain in their natural, water-wet state. This would lead to both lower oil retention and to smaller reductions in permeability.

Unfortunately it is important that another essential component of OBM's, the weighting agent, remains oil wet. This is usually barite and when water-wet this material agglomerates and rapidly sediments out of the fluid. When water-wetting is severe it can be difficult to maintain a constant mud weight the consequence of which could be a well control problem.

We have now found that by making the weighting agent hydrophobic by pre-treatment, oil based muds may be formulated which do not contain emulsifiers and oil wetting agents thereby minimising their adverse effects.

Thus according to the present invention there is provided an oil-based drilling mud comprising:
(a) a base oil,
(b) about 1 to about 170 parts by weight of an aqueous phase per 100 parts by weight of the oil,
(c) about 0.25–40 g/l of at least one viscosifier, and
(d) a hydrophobic weighting agent in amount suitable to achieve a required mud density.

The oil employed as the base oil may be any suitable organic liquid immiscible with water.

Suitable organic liquids include hydrocarbons, esters, and ethers.

Particularly suitable base oils are kerosenes or diesels, for example, the refined kerosene of low toxicity known as BP 83HF supplied by BP Chemicals.

The aqueous phase may be, for example, fresh water or salt water, in particular containing sodium chloride, potassium chloride. calcium chloride or magnesium chloride.

The aqueous phase is preferably present in amount 30–120 Darts by weight per 100 parts by weight of the oil phase.

Viscosifiers which may be employed include organophilic clays or suitable organic polymers, for example, styrene butadiene copolymers.

The viscosifier or mixture of viscosifiers is preferably present in amount 4–20 g/l.

If required the oil-base drilling mud of the present invention may be formulated with other ingredients such as fluid loss additives, lime or lost circulation materials.

Oil based muds according to the present invention do not contain emulsifiers or oil wetting agents. By emulsifiers and oil wetting agents we mean those constituents of traditional oil based drilling muds specifically used to emulsify the water phase and to ensure that the solids in the mud are wetted by the oil.

By employing oil based muds according to the present invention the adverse effects of such emulsifiers may be reduced.

The oil based muds of the present invention are particularly advantageous in their reduction in oil retention on cuttings and smaller reduction in permeability of oil bearing formations.

Weighting agents suitable for use in the present invention include barite (barium sulphate), haematite, ilmenite, siderite. dolomite and calcium carbonate. The preferred weighting agent is barite.

The weighting agents are pretreated with suitable chemicals in order to make them hydrophobic.

Suitable chemicals include siloxanes and silanes.

The coating may be applied by conventional methods either during the grinding of the mineral or post production treatment for example ball milling, micronising, high shear mixing or pin milling.

Typically the coating is present in an amount 0.05 to 2% by weight of the weighting agent.

For example barite may be treated with a polymethylhydrogen siloxane followed by heat curing to form a coating on the surface of the barite to make it strongly hydrophobic.

The present invention is illustrated with reference to the following Examples in which Examples 1–3 illustrate the preparation of hydrophobic barite for use in the present invention, Examples 4–9 exemplify a drilling muds according to the present invention and Examples 10–15 indicate the properties of drilling muds of the present invention by comparison with conventional oil based muds.

EXAMPLE 1

Using a Colishaw high speed mixer, standard API barite was coated with a polymethyl hydrogen siloxane supplied by Dow Corning and known as Dow Corning 1107. The siloxane was injected at such a rate to give a 1% w/w coating on the barite. The coated barite was mixed for at least 10 minutes prior to heat curing at 120° C. for 16 hours.

EXAMPLE 2

Using a Waring blender standard API barite was coated with octadecyltrichlorosilane supplied by Fluka Chemicals Ltd. The silane was injected at such a rate to give a 1% w/w coating on the barite. The coated barite was mixed for at least 10 minutes prior to heat curing at 120° C. for 16 hours.

EXAMPLE 3

Using a Colishaw high speed mixer standard API barite was coated with a methyltrimethoxy silane supplied by Dow Corning and known as Dow Corning Z-6070. The silane was injected at such a rate to give a 1% w/w coating on the barite. The coated barite was mixed for at least 10 minutes prior to heat curing at 120° C. for 16 hours.

EXAMPLE 4

An oil-based drilling mud was prepared by conventional laboratory methods. 20g of an approximately 50:50 mixture of the organophilic clays known as Truvis and Vistone both supplied by International Drilling Fluids (IDF) were added to 723 mls of kerosene (BP83HF). 181 mls of a 1.2 SG aqueous solution of $CaCl_2$ brine were blended into the mixture followed by the addition of 405g of hydrophobic barite. The resultant mud after hot rolling at 120° C. for 16 hrs had an oil/brine ratio of 80/20 and a mud weight of 1.2 SG.

This represents a mud with 37 parts by weight of aqueous phase per 100 parts by weight of the oil and 20 g/l of viscosifier.

EXAMPLE 5

An oil-based drilling mud was prepared by conventional laboratory methods. 12.9g of an organophilic clay known as Truvis was added to 710 mls of kerosene (BP83HF). 189 mls of a 22.6% w/w $CaCl_2$ brine was blended into the mixture followed by 5.7g of an organic polymer known as Truflo 100 supplied by IDF as fluid loss additive, 0.3g of an organic polymer known as polyvinyl behenate as stabilizer and 398g of hydrophobic barite. The resultant mud had an oil/water ratio of 80/20 and a mud weight of 1.2 SG.

This represents a mud with 40 parts by weight of aqueous phase per 100 parts by weight of the oil and 12.9 g/l of viscosifier.

EXAMPLE 6

An oil-based drilling mud was prepared by conventional laboratory methods. 4.3g of an organophilic clay known as Truvis was added to 529 mls of kerosene (BP83HF). 395 mls of a 22.6% w/w $CaCl_2$ brine was blended into the mixture followed by 5.7g of an organic polymer known as Truflo 100, 0.3g of an organic polymer known as polyvinyl behenate; 2.9g of an organic polymer known as IDF-628 as thinner and 2878 of hydrophobic barite. The resultant mud had an oil/water ratio of 60/40 and mud weight of 1.2 SG.

This represents a mud with 112 parts by weight of aqueous phase per 100 parts by weight of the oil and 4.3 g/l of viscosifier.

EXAMPLE 7

An oil-based drilling mud was prepared by conventional laboratory methods. 4.3g of an organophilic clay known as Truvis was added to 532 mls of kerosene (BP83HF). 398 mls of a 22.6% w/w $CaCl_2$ brine was blended into the mixture followed by 294g of hydrophobic barite. The resultant mud had an oil/water ratio of 60/40 and a mud weight of 1.2 SG.

This represents a mud with 112 parts by weight of aqueous phase per 100 parts by weight of the oil and 4.3 g/l of viscosifier.

EXAMPLE 8

An oil-based drilling mud was prepared by conventional laboratory methods. 12.9g of an organophilic clay known as Truvis was added to 710 mls of kerosene (BP83HF). 190 mls of a 22.6% w/w $CaCl_2$ brine was blended into the mixture followed by 392g of hydrophobic barite. The resultant mud had an oil/water ratio of 80/20 and a mud weight of 1.2 SG.

This represents a mud with 40 parts by weight of aqueous phase per 100 parts by weight of the oil and 12.9 g/l of viscosifier.

EXAMPLE 9

An oil-based drilling mud was prepared by conventional laboratory methods. 10.0g of an organophilic clay known as Truvis was added to 639 mls of kerosene (BP83HF). 164 mls of a 22.6% w/w $CaCl_2$ brine was blended into the mixture followed by 5.7g of an organic polymer known as Truflo 100, 0.3g of an organic polymer known as polyvinyl behenate and 764g of hydrophobic barite. The resultant mud had an oil/water ratio of 80/20 and a mud weight of 1.5 SG.

This represents a mud with 47 parts by weight of aqueous phase per 100 parts by weight of the oil and 10 g/l of viscosifier.

EXAMPLE 10

London clay and Kimmeridge clay were used to assess the shale inhibition characteristics of a 1.2 SG 80/20 oil-based mud prepared according to Example 4 in comparison with a conventional Baroid oil-based mud having the following formulation:

Base oil (BP 83HF) 0.69 bbl
Geltone 8 ppb
EHV LFR 2000 1.82 ppb
Water 0.166 bbl
$CaCl_2$ (99%) 18.15 ppb
Invermul 5 ppb
Ezmul 1 ppb
Lime 6 ppb
Barites 120 ppb Two test methods were employed:

(a) Hot Rolled Cutting Dispersion Test

Approximately 15g of 2–4 nun cuttings were placed in a hot rolling cell together with 250 ml of the mud under investigation. Hot rolling was carried out at 93° C. for 16 hours. After ageing the cuttings were recovered on a 500 μsieve, washed, dried and weighed.

(b) Slaked Durability Test

Approximately 100g of 4–8 nun cuttings were placed in a cylindrical brass mesh cage and rolled in 2.51 of mud at 20 rpm for 4 hours. After rolling the remaining cuttings were washed, dried and weighed.

The results of both tests are given below clearly showing that the oil-based muds of the present invention are compatible in their shale inhibition with conventional oil-based muds.

| MUD TYPE | SHALE TYPE | TEST | % RECOVERY OF CUTTINGS |
| --- | --- | --- | --- |
| BAROID | LONDON | HOT ROLL | 100 |

| MUD TYPE | SHALE TYPE | TEST | % RECOVERY OF CUTTINGS |
|---|---|---|---|
| OBM BAROID | KIMMERIDGE | HOT ROLL | 100 |
| OBM* | LONDON | HOT ROLL | 100 |
| OBM* | KIMMERIDGE | HOT ROLL | 100 |
| BAROID OBM | LONDON | SLAKED DURABILITY | 100 |
| BAROID OBM | KIMMERIDGE | SLAKED DURABILITY | 100 |
| OBM* | LONDON | SLAKED DURABILITY | 100 |
| OBM* | KIMMERIDGE | SLAKED DURABILITY | 100 |

*Oil-based mud containing hydrophobic barite

EXAMPLE 11

A number of oil-based muds according to the present invention were compared at a range of oil/water ratios to further assess the shale inhibition characteristics.

A ball clay supplied by English China Clays and known as Hycast Classic was used. Approximately 100g of ball clay (2-5mm) was placed in a cylindrical brass cage and rolled in 1.5 litres of 1.2 SG mud at 20 rpm for 4 hours. After rolling, the remaining cuttings were washed, dried and weighed. The results are given below with a comparison with the conventional oil based mud of Barold as described in Example 10.

| OIL/WATER RATIO | % RECOVERY OF CUTTINGS |
|---|---|
| 80/20 | 96.6 |
| 70/30 | 96.0 |
| 65/35 | 99.6 |
| 80/20* | 96.9 |

*Bariod oil based mud.

EXAMPLE 12

Oil retention on cuttings occurs by three main methods. It can be retained on the surface of the cutting, imbibed into it or carried in mud along with the cutting. Drilling fluids which allow cuttings to remain in a water-wet state would therefore be expected to lead to lower oil retention. This is because less oil would be retained on the cuttings' surface and imbibition should also be minimised.

The amount of oil retention on water-wet cuttings was tested for both an OBM according to the present invention and a conventional oil-based mud.

A 75/25 oil-based mud was prepared according to the general method of Examples 4-9 with the following formulation:
Kerosene (BP 83HF) 684 ml
1.2 SG CaCl$_2$ brine 228 ml
hydrophobic barite 351 g
TRUVIS 11.4 g A commercial Baroid 75/25 oil-based mud was used for the comparison.

The test were performed by immersing 40-100 mesh sandstone cuttings, pre-wetted with seawater, in the oil-based mud, hot rolling, removing the cuttings by sieving and then measuring their oil retention.

The oil-based mud according to the invention had a retention on average of between 30-70 g/Kg. This compared with a retention of 100-150 g/Kg for the conventional Baroid mud indicating the reduced oil retention properties of the emulsifier-free oil based muds of the present invention.

EXAMPLE 13

A Thule VSM 100 shale shaker was used to further assess oil retention on cuttings for both an OBM according to the present invention and a conventional oil based mud. A 60/40 oil based mud was prepared using the general method according to Examples 4-9 with the following formulation:
Kerosene (BP83HF) 550 ml
1.2 SG CaCl$_2$ brine 390 ml
Hydrophobic barite 231 g
TRUVIS 8.2 g
Lime 2.8 g A commercial 60/40 oil based mud from International Drilling Fluids was used for comparison. The tests were performed by immersing cuttings, pre-wetted with seawater, in the oil based mud and passing the mixture over the Thule VSM 120 shale shaker, fitted with a 40 mesh screen. Tests were preformed with sandstone (<2mm), limestone (1-4mm) and shale (1-4mm). The results are given below.

|  | OBM* | IDF OBM |
|---|---|---|
| Sandstone | 35.6 g/Kg | 123.5 g/Kg |
| Limestone | 15.3 g/Kg | 41.3 g/Kg |
| Shale | 51.0 g/Kg | 96.8 g/Kg |

*Oil-based mud containing hydrophobic barite according to the present invention.

The results clearly show the reduced oil retention properties of the emulsifier free oil based muds of the present invention.

EXAMPLE 14

The formation damage potential of the muds of the present invention was assessed by coreflood testing.

Marnock core was selected for testing due to its susceptibility to high levels of damage from oil based muds.

A core plug was prepared and mounted in a coreflood test rig using a confining pressure and back pressure of 70 bar and 10 bar respectively. Kerosene was flooded through the plug in both forward and reverse directions until a stable permeability was achieved. This was followed in the forward direction by approximately 10 pore volumes of a filtrate prepared from a 75/25 oil-based mud prepared according to, the general method of Examples 4-9, having the following formulation:
Kerosene (BP 83HF) 684 ml
1.2 SG CaCl$_2$ brine 228 ml
hydrophobic barite 351 g
TRUVIS 11.4 g This was to simulate invasion into the reservoir.

Kerosene was then flushed back through the core in the reverse direction to simulate production until a stable permeability reading was obtained. Finally kerosene was flooded in the forward direction as above.

The results are given as follows:

|  | PERMEABILITY | | |
|---|---|---|---|
|  | BEFORE | AFTER | CHANGE |
| FORWARD | 25.3 mD | 23.8 mD | −6% |

| PERMEABILITY | | |
| --- | --- | --- |
| | BEFORE | AFTER | CHANGE |
| REVERSE | 25.3 mD | 21.4 mD | −15% |

The percentage change in permeability which gives an indication of the amount of formation damage represents an improvement on results obtained on the same core with conventional oil-based muds where permeability reductions of 50–60% were typically obtained.

EXAMPLE 15

A core plug was prepared and mounted in a coreflood test rig using a confining pressure and back pressure of 70 bar and 10 bar respectively. Kerosene was flooded through the plug in both forward and reverse directions until a stable permeability was achieved. This was followed in the forward direction by approximately 10 pore volumes of a filtrate prepared from a 60/40 oil-based mud prepared according to the general method of Examples 4–9 having the following formulation:

Kerosene (BP83HF) 531 ml
$CaCl_2$ brine (22.6% w/w) 397 ml
Hydrophobic barite 294 g
TRUVIS 4.3 g Kerosene was then flushed back through the core in the reverse direction, to simulate oil production, until a stable permeability reading was obtained, and then in the forward direction. Finally, the sequence above was repeated with a standard oil-based mud supplied by International Drilling Fluids (IDF).

The results are given below.

| | PERMEABILITY | | | | |
| --- | --- | --- | --- | --- | --- |
| | | OBM* | | OBM(IDF) | |
| | Before | After | Change | After | Change |
| Forward | 3.03 mD | 3.03 mD | 0 | 1.43 mD | −53% |
| Reverse | 3.01 mD | 3.23 mD | +7% | 1.38 mD | −54% | mD = milli Darcies
*oil based mud containing hydrophobic barite.

These clearly show the improvement obtained in permeability when using the oil based muds according to the present invention.

I claim:

1. An oil based drilling mud comprising
   (a) a base oil,
   (b) abut 1 to about 170 parts by weight of an aqueous phase per 100 parts by weight of the oil,
   (c) about 0.25–40 g/l of at least one viscosifier, and
   (d) a hydrophobic weighting agent in amount suitable to achieve the required mud density, said weighting agent comprising a material selected from the group consisting of barite, haematite, ilmenite, siderite, dolomite and calcium carbonate, said material having a coating hereon comprising a siloxane or silane.

2. An oil based drilling mud according to claim 1 wherein the aqueous phase is present in amount 30 to 120 parts by weight per 100 parts by weight of the oil.

3. An oil based drilling mud according to claim 1 wherein the viscosifier or mixture of viscosifiers is present in amount 4–20

4. An oil based drilling mud according to claim 1 wherein the base oil is an organic liquid immiscible with water.

5. An oil based drilling mud according to claim 4 wherein the base oil is a kerosene.

6. An oil based drilling mud according to claim 1 wherein the viscosifier is an organophilic clay.

7. An oil based drilling mud according to claim 1 wherein the hydrophobic weighting agent is barite.

8. An oil based mud according to claim 1 wherein the siloxane or silane is present in amount 0.05–2% by weight of the weighting agent.

9. An oil based mud according to claim 1 which additionally comprises a fluid loss additive and/or a lost circulation material.

10. The oil based drilling mud of claim 1 wherein said aqueous phase is present in an amount of 30 to 120 parts by weight per 100 parts by weight of the oil, wherein the viscosifier is present in an amount of 4 to 20 g/l, and further wherein said base oil is an organic liquid immiscible with water.

11. The oil based drilling mud of claim 1 wherein said base oil is kerosene.

12. The oil based drilling mud of claim 1 wherein said viscosifier is an organophilic clay.

13. The oil based drilling mud of claim 12 wherein said material is barite.

* * * * *